3,365,272
PREPARATION OF SYNTHETIC FAUJASITE CONTAINING EXCHANGEABLE MAGNESIUM CATIONS
Edward B. Cornelius, Swarthmore, James E. McEvoy, Morton, and George Alexander Mills, Swarthmore, Pa., assignors to Air Products and Chemicals, Inc., Philadelphia, Pa., a corporation of Delaware
No Drawing. Filed May 24, 1965, Ser. No. 458,406
2 Claims. (Cl. 23—113)

This invention relates to methods for the preparation of large pore, low density zeolitic compositions sometimes described as synthetic faujasites.

Natural and synthetic zeolites can be ion exchanged to form ammonium zeolites, which can be carefully heat treated under vacuum to remove water and ammonia and to prepare anhydrous hydrogen zeolite compositions. Further heat treatment removes additional water to provide a decationized alumino silicate having an acidity (sometimes measured by sorption of the vapor of an amine) significantly less than the ion exchange capacity of the ammonium zeolite from which it was derived. Different types of zeolites are best distinguished by reference to the corresponding acidic alumino silicates derived by thermal decomposition of the ammonium zeolites, thereby eliminating the complications which might be attributable to the nature of the exchangeable metallic cations. Amorphous zeolites lose surface area at lower temperature than most crystalline zeolites but manufacturing costs for synthetic cracking catalysts were for many years cheaper through amorphous zeolites than through crystalline ammonium zeolite intermediates.

Substantially all crystalline anhydrous hydrogen zeolites have densities of the general magnitude of about 2, thus being less than a corresponding fused alumino silicate glass. The low density constitutes additional evidence of the presence of pores throughout the crystal structure. Every crystalline hydrogen zeolite is converted first to a partially amorphous product having less acidity and then to a more and more amorphous sintered product by increasingly severe thermal treatment. An article by W. H. Baur in the American Mineralogist, vol. 49, page 697, explains that the density, in grams per cubic centimeter (g./cc.) as measured by X-ray diffraction for hydrated sodium faujasite is 1.91, but that the aluminosilicate framework has a density of only 1.25 g./cc. Baur notes that natrolite has an overall density of 2.25 g./cc. and that its aluminosilicate framework measures 1.77 g./cc., that sanidine has an overall density of 2.56 and that its aluminosilicate framework has a density of 2.20 g./cc. Baur contrasts the density of various zeolites with that of quartz, which measures 2.65 g./cc. both on an overall and on its framework basis. Hydrogen zeolites derived from ammonium zeolites are believed to have densities corresponding approximately to the framework densities discussed by Baur.

Only small amounts of faujasite have been observed at various locations in nature. Several varieties of synthetic sodium faujasite have been described in the literature in recent years. Technologists familiar with density measurements and crystallinity measurements designate compositions as synthetic sodium faujasite even though the uniformity of crystal structure, or silica alumina ratio, or other properties might differ from a sodium faujasite prepared by exhaustive ion exchange of one of the tiny rare samples of natural faujasite. Although wide differences exist among faujasites, all faujasites differ significantly from the more common varieties of crystalline zeolites.

The thermal stability of synthetic faujasites having a silica to alumina unit ratio within the range from about 3.3 to about 6.8 has stimulated interest in the high silica ratio faujasites among those concerned with elevated temperature operations. Low silica ratio faujasites, such as those having a unit ratio for silica to alumina from about 2 to about 2.7 have been of interest to those concerned with minimum cost of production of large pore molecular sieves. Some of the samples of faujasites having an intermediate silica to alumina unit ratio of about 3±0.3 have apparently lacked both the thermal stability of the high silica ratio materials and the ease of preparation of the low silica ratio materials. Possibly for these or other reasons, faujasites having a silica to alumina ratio of about 3±0.3 have aroused somewhat less interest than faujasites above and below such range. Several of the samples of natural faujasite reported in the literature have happened to have a silica to alumina unit ratio of the general magnitude of 5 but the rarity of the mineral makes it difficult to predict what may be observed in other samples which may be found eventually. Some analyses have indicated the presence of magnesium as among the cations present in the zeolitic structure of at least some samples of natural faujasite. Some technologists have found it difficult to displace magnesium from certain natural zeolites and from certain synthetic zeolites. Technologists familiar with the difficulties of removing magnesium from zeolites by ion exchange might have deemed magnesium-containing natural faujasite (even if abundant) as an unsuitable starting material for preparing by ion exchange a family of molecular sieves containing selected cations and having the molecular sieve properties associated with such selected cation. Some natural zeolites other than faujasite are free from magnesium and such other natural zeolites might have appeared more interesting than magnesium-containing faujasite to some of the technologists first evaluating zeolites.

Heretofore, descriptions of the preparation of synthetic faujasite having a silica to alumina ratio higher than about 3.3 to 1 generally indicated that only the sodium faujasite could be prepared directly, and that subsequent ion exchange of the synthetic sodium faujasite was necessary for production of faujasites containing other exchangeable metallic cations. Thus, the synthesis of synthetic faujasite has been distinguished from the preparation of quite a variety of other synthetic zeolites. Certain lithium zeolites and certain potassium zeolites have been synthesized without ion exchange of sodium zeolite intermediate, but faujasites have been distinguished from such zeolites on the theory that no synthesis of a faujasite was attainable except as the sodium faujasite.

The present invention proves the inaccuracy of such previous emphasis upon the uniqueness of high silica sodium faujasite as the only high silica faujasite capable of synthesis.

In accordance with the present invention a crystalline zeolite having the large pore open structure of a faujasite and having a silica to alumina ratio greater than 3.3 to 1 is prepared in such a manner that magnesium is among the significant cations present in the composition.

The nature of the invention is further clarified by reference to a plurality of examples.

*Example 1*

A pilot plant facility designed to produce about 100 kilograms of magnesium zeolite per batch includes a nutrient solution consisting of:

|  | Kg. |
|---|---|
| Alumina trihydrate | 34.6 |
| Amorphous silica | 300.0 |
| Magnesium oxide | 4.4 |
| Sodium hydroxide | 158.0 |
| Water | 1580.0 |

Such a nutrient can be prepared by combining a recycled mother liquor consisting of:

| | Kg. |
|---|---|
| Amorphous silica | 207 |
| Sodium hydroxide | 140.7 |
| Water | 1500 | with a make-up solution consisting of:

| | Kg. |
|---|---|
| Alumina trihydrate | 34.6 |
| Amorphous silica | 93.0 |
| Magnesium oxide | 4.4 |
| Sodium hydroxide | 17.3 |
| Water | 80.0 |

The nutrient solution is permitted to age quiescently for about a day (8–40 hours) at about ambient temperature (20–30° C.) and then to age quiescently for about a day (8–40 hours) at an elevated temperature in the 80–110° C. range preferably about 95° C. The solution is then filtered to provide about 1850 kg. of mother liquor and 100 kg. of synthetic magnesium faujasite corresponding to the formula

$$0.5MgO \cdot 0.95Na_2O Al_2O_3 \cdot 4.52SiO_2 \cdot 9H_2O$$

such magnesium faujasite may be employed as such or may be activated to an anhydrous molecular sieve, but is desirably first ion-exchanged with at least a 200% excess beyond the stoichiometric amount of ammonium ion. It is convenient to describe such product as ammonium faujasite, and as a product from which substantially all of the sodium content has been removed even though more residual sodium can be removed by still more extreme ion exchange requiring more than 200% excess ammonium ion.

*Examples 2–8*

A finely divided amorphous silica can be prepared by acidification of sodium silicate and spray drying of the colloidal silica solution. Other methods can be used to make finely divided amorphous silica. Several brands of finely divided amorphous silica are commercially available, one of which is marketed as HiSil 233.

A cool aqueous solution of sodium aluminate was modified by the addition of sodium hydroxide. Care was taken to maintain considerable agitation of the mixture during the addition of reactive silica (HiSil 233). Magnesium hydroxide was then added to the agitated solution to prepare a creamy nutrient solution. The thus prepared nutrient was aged under conditions of significant quiescence. The initial and especially critical aging was at ambient temperature within the 20–40° C. range for approximately three days. Agitation, boiling, and excessive temperatures must be avoided in the hot aqueous aging at 70–98° C. for approximately one day. In order to minimize thermal agitation, it is advantageous, when heating from ambient to hot aging conditions, to use only moderate temperature differentials (e.g., heating on water bath electrically regulated for about 0.5° C./minute temperature rise). Recrystallization occurs in the precipitate which apparently interacts with components in the large volume of quiescent liquid. After the approximately 100 hours of aging, the precipitate is filtered from the mother liquor and preliminarily washed with deionized water. Analysis of the zeolitic product shows the presence of entrained alkaline hydroxides, whereby the ratio of equivalents of alkali to aluminum atoms is greater than 1 to 1 instead of the theoretical 1:1 ratio common to many zeolites. If a synthetic zeolite is scheduled for ion-exchange, exhaustive water washing is not efficient, inasmuch as the removable residual alkaline oxides are more efficiently removed during ion exchange.

In describing the nutrient solutions, it is convenient to designate the use of 164 g. of sodium aluminate, providing 1 mole of alumina, and corresponding quantities of other reactants, but larger or smaller batches of nutrient composition can be prepared by compliance with the mole ratio data. The products are effectively described by mole ratio data. Each product is shown to have the structure of magnesium faujasite by X-ray diffraction studies and by density measurements. Additional data on this series of magnesium faujasite are set forth in the table.

TABLE A

| Ex. No. | Units | Nutrient Composition | | | | | Anhydrous Product | | | |
|---|---|---|---|---|---|---|---|---|---|---|
| | | NaAlO₂ | NaOH | Mg(OH)₂ | SiO₂ | H₂O | MgO | Na₂O | Al₂O₃ | SiO₂ |
| 2 | Moles | 2 | 7.7 | 1 | 20 | 400 | 0.87 | 0.46 | 1 | 4.4 |
| 2 | Grams | 164 | 308 | 58 | 1,200 | 7,200 | | | | |
| 3 | Moles | 2 | 8 | 0.5 | 20 | 400 | 0.55 | 1 | 1 | 4.2 |
| 3 | Grams | 164 | 320 | 29 | 1,200 | 7,200 | | | | |
| 4 | Moles | 2 | 8 | 0.5 | 20 | 400 | | | | |
| 5 | do | 2 | 7.7 | 0.5 | 20 | 400 | | | | 4.01 |
| 6 | do | 2 | 7.5 | 0.5 | 20 | 400 | 0.48 | 0.91 | 1 | 4.25 |
| 7 | do | 2 | 7.0 | 0.5 | 20 | 400 | 0.5 | 0.95 | 1 | 4.5 |
| 8 | do | 2 | 6.5 | 0.5 | 20 | 400 | | | 1 | 4.3 |

The preparation of a magnesium faujasite from a nutrient containing magnesium hydroxide is a result which would not have been obvious to zeolitic technologists.

*Examples 9–12*

Ammonium salt solution (about 20% concentration) was employed in ion-exchanging selected magnesium zeolites. Some runs were at ambient temperature and some at about 90° C. Eight stages of ammonium salt treatment were followed by eight stages of water washing. Data relating to the ion-exchange runs, and to the ammonium magnesium zeolite products, are set forth in the following table.

TABLE B

| Ex. No. | Derivative of Ex. No. | Anion | ° C. | Purity, Percent | Mole Ratios of Anhydrous Product | | | | |
|---|---|---|---|---|---|---|---|---|---|
| | | | | | NH₄ | MgO | Na₂O | Al₂O₃ | SiO₂ |
| 9 | 2 | NO₃ | 20 | 50 | 1 | 0.26 | 0.09 | 1 | 4.39 |
| 10 | 3 | NO₃ | 90 | 100 | 0.78 | 0.16 | 0.08 | 1 | 3.5 |
| 11 | 6 | Cl | 20 | 95 | 1.3 | 0.23 | 0.15 | 1 | 4.2 |
| 12 | 7 | Cl | 20 | 100 | 1.3 | 0.20 | 0.20 | 1 | 4.2 |

The products of Examples 10–3, 11–6, and 12–7 were high purity crystalline zeolites, but the products of Examples 9–2 were contaminated by significant impurities. Because a significant portion of the magnesium ion is removed by the ammonium exchange, the varieties of uses for the product are significantly greater than would have been obvious to zeolitic technologists. Moreover, even less residual sodium contaminates ammonium faujasite derived from magnesium faujasite than results from 8 stage ion exchange of sodium faujasite, the removal of the magnesium apparently accelerating removal of sodium. Such attainment of faujasite of low residual sodium by such ion exchange constitutes an advantage which would not have been predicted for such a magnesium faujasite. The proof that the crystalline zeolite is faujasite is established by density measurements of the hydrogen faujasite. Additional evidence that the described magnesium zeolite is a faujasite is obtained by an evaluation of X-ray diffraction data.

*Examples 13–14*

Cracking catalysts were prepared by admixing 10% of the thus prepared ammonium magnesium zeolitic aluminosilicate with plastic clay, extruding pellets, and heating the pellets in steam to produce cracking catalyst pellets. The steam stability of the pellets was evaluated by artificially aging the pellets by a heat treatment at 850° C. in 100% steam for about 4 hours. The artificially aged particles were evaluated by the standard cracking procedure to provide the following data:

TABLE C

| Ex. No. | NH$^4$ derived from Ex. No. | Mg derived from Ex. No. | Gaso., Vol. percent | Coke, Wt. percent | Gas, Wt. percent | Gas Gravity | Conv., Wt. percent | Select, Wt. percent |
|---|---|---|---|---|---|---|---|---|
| 13 | 11 | 6 | 51.1 | 1.8 | 13.7 | 1.45 | 61.0 | 75.5 |
| 14 | 12 | 7 | 55.1 | 2.0 | 15.4 | 1.50 | 66.1 | 75.0 |

The steam stability of a cracking catalyst is measured by testing the cracking performance after an artificial aging treatment. Conditions as severe as 850° C. in 100% steam for four hours destroys most of the activity of many cracking catalysts. The excellent performance of such a catalyst after such severe steam treatment was deemed evidence of potential usefulness for this type of catalyst.

By a series of tests it is established that the nutrient solution for the preparation of magnesium faujasite should follow substantially the same formulation as for making sodium faujasite, except that magnesium hydroxide is added in a molar amount constituting at least 5% but less than 25% of the molar amount of sodium hydroxide otherwise employed. The amount of sodium hydroxide in the nutrient should be decreased by not more than 40% of the molar amount of magnesium hydroxide employed. The nutrient composition thus contains a ratio of sodium hydroxide to magnesium hydroxide within a range from about 4 to 1 to about 20 to 1. The unit ratio of silicon atoms to alkaline cations must be in the range from 2.0 to 5. The silicon atom to aluminum atom unit ratio must be in the range from 5 to 20. The water to alkaline cation unit ratio must be from 50 to 120. It is generally desirable to operate reasonably close, such as plus or minus about one-fifth, the ratios employed in Examples 2–7 instead of trying to approach the extremes of the designated ratios.

Instead of substituting magnesium, it is feasible to substitute calcium or mixtures of calcium and magnesium. However, such cations as lead or tin cannot be equivalents to the magnesium of the present invention.

Maximum care should be taken in controlling conditions of recrystallization, inasmuch as poor yields of faujasite are more likely to result from neglect of aging than from neglect of composition ratios. The aging at 20–30° C. is especially important, as is the gradual, substantially quiescent heating at 80–98° C. Relatively brief aging, such as from 5 to 30 hours can be sufficient hot aging, although from about 3 to 20 times as long a recrystallization at ambient temperature is desirable though usually such ambient aging is terminated prior to 200 hours.

Obviously many modifications and variations of the invention as hereinbefore set forth may be made without departing from the spirit and scope thereof, and therefore only such limitations should be imposed as are indicated in the appended claims.

The invention claimed is:

1. The method of preparing an aluminosilicate product having a crystalline structure corresponding to a faujasite and having zeolitically bound magnesium cations, which method consists of: preparing an aqueous nutrient mixture containing a source of silica, a source of alumina, sodium hydroxide, and magnesium hydroxide in which the unit ratio of silicon atoms to alkaline cations is within the range from 2.0 to 5, the unit molar ratio of sodium hydroxide to magnesium hydroxide is within the range from about 4 to about 20, the silicon atom to aluminum atom unit ratio is within the range from 5 to 20, and the water to alkaline cation unit ratio is within the range from 50 to 120; maintaining said nutrient solution at quiescent aging conditions at a temperature within the range from 20° to 30° C. during a period from about 5 to about 200 hours; heating the nutrient solution gradually and substantially quiescently to a temperature within the range from about 80° to about 98° C. for from 5 to 40 hours; separating the resulting crystals of aluminosilicate from the liquid; washing such crystals; and recovering the washed crystals.

2. The method of claim 1 in which the nutrient mixture contains components in an amount departing not more than 20% from the following formulation: silicon atom to alkaline atom unit ratio 2.23; sodium hydroxide to magnesium hydroxide unit mole ratio 17; water to alkaline cation unit ratio 44.4.

References Cited

UNITED STATES PATENTS 2,882,244  4/1959  Milton _____ 23—113
3,130,007  4/1964  Breck _____ 23—113

OTHER REFERENCES

Barrer et al.: "Helvetica Chimica Acta," vol. 39, No. 61, 1956, pp. 518–530.

EDWARD J. MEROS, *Primary Examiner.*